United States Patent [19]

Whellams

[11] 4,393,344
[45] Jul. 12, 1983

[54] SQUIRREL CAGE INDUCTION MOTORS

[76] Inventor: Geoffrey E. Whellams, 3 Spruce Ave., Greenstead, Colchester, Essex, England

[21] Appl. No.: 168,684

[22] Filed: Jul. 11, 1980

Related U.S. Application Data

[62] Division of Ser. No. 14,114, Feb. 22, 1979, abandoned.

[51] Int. Cl.³ .............................................. H02P 3/24
[52] U.S. Cl. .................................... 318/759; 318/761; 310/211
[58] Field of Search ............... 318/759, 760, 762, 761; 310/211

[56] References Cited

U.S. PATENT DOCUMENTS

| 919,524 | 4/1969 | Barnholdt | 301/211 |
| 2,434,919 | 1/1948 | Girard | 318/762 |
| 2,828,457 | 3/1958 | Noddleman | 318/759 |
| 2,858,494 | 10/1958 | Choudharx | 318/762 |
| 3,391,293 | 7/1968 | Purcell et al. | 318/759 |
| 3,678,353 | 7/1972 | Marchi | 318/762 |
| 3,758,837 | 9/1973 | Stauber et al. | 318/762 |
| 4,063,137 | 12/1977 | Hoshimi et al. | 318/761 |
| 4,158,225 | 6/1979 | Hertz | 363/150 |

FOREIGN PATENT DOCUMENTS 793622 11/1935 France ............................ 318/760

Primary Examiner—David Smith, Jr.
Attorney, Agent, or Firm—Varnum, Riddering, Wierengo & Christenson

[57] ABSTRACT

A squirrel cage motor comprises a stator and a rotor, the latter having a pair of end rings and conductor bars interconnecting the end rings, the bars and rings being supported on the rotor core. At least one end ring is provided with at least two insulating gaps to divide that end ring into at least two separate portions. The rotor of the motor can be braked to stop at a predetermined position by applying to the secondary winding of the stator D.C., or A.C. of the same phase as that applied to the primary winding. A three-phase motor can similarly be arranged by providing at least three gaps in at least one end ring.

10 Claims, 10 Drawing Figures

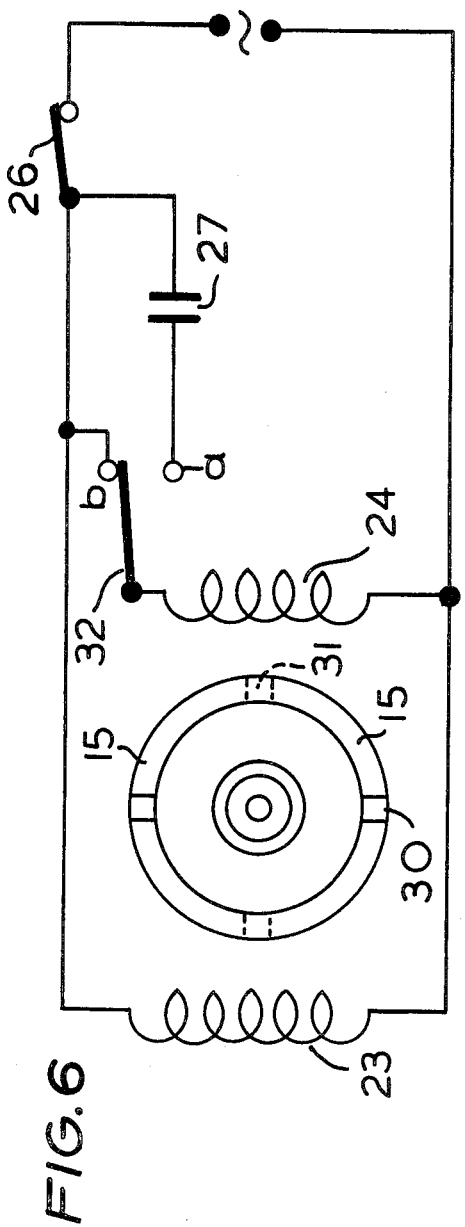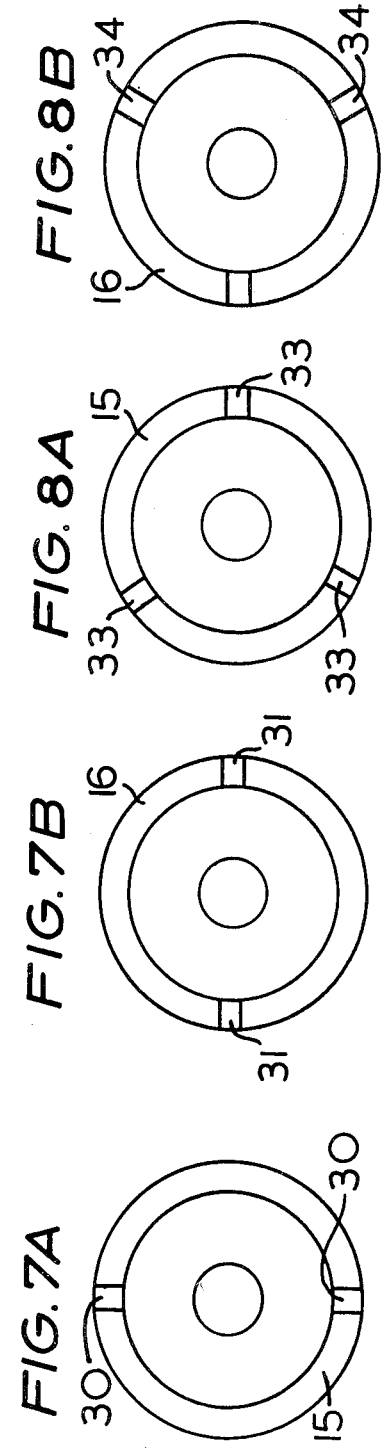

SQUIRREL CAGE INDUCTION MOTORS

This is a division of application Ser. No. 014,114, filed Feb. 22, 1979, now abandoned.

BACKGROUND OF THE INVENTION (a) Field of the Invention

This invention relates to electric motors of the squirrel cage type.

(b) Description of the Prior Art

A squirrel cage motor is an induction electric motor in which a rotor carries conductors arranged in the form of a cage built up of two conductor end rings joined by conductor bars which are often made of copper or die-cast aluminium.

The rotor core is of a laminated construction, made up of a large number of sheets of thin steel insulated from one another by a coating of an oxide or varnish. The stator usually consists of a laminated steel core with at least one distributed winding. Only the primary winding in the stator is connected to an alternating current (A.C.) power supply, and current is thereby induced in the secondary rotor cage winding. The magnetic forces so produced cause the rotor to rotate.

A known technique for braking a squirrel cage motor is to pass direct current through the stator winding. Eddy currents are thereupon induced in the conductors of the rotor cage and in accordance with Lenz's law, these produce a torque opposing rotation. For some purposes it is desirable that the rotor of a squirrel cage motor when braked always comes to rest at the same angle or at one of a number of predetermined angles with respect to the stator. I have now discovered a simple method of enabling this is to be done.

OBJECTS OF THE INVENTION

It is accordingly an object of this invention to provide a modified squirrel cage motor the rotor of which, when braked by the suitable application of electrical power to the stator winding, always comes to rest at the same angle or one of a predetermined number of angles with respect to the stator.

It is a further object of this invention to provide a squirrel cage motor which is easy to manufacture or to adapt from an existing squirrel cage motor and which displays the braking characteristics described above.

Further objects and advantages of this invention will become apparent from the following description of a squirrel cage motor arranged in accordance with this invention.

SUMMARY OF THE INVENTION

According to one aspect of the present invention, I provide a squirrel cage motor of the single phase running type, which comprises a rotor and a stator, the rotor being arranged in the form of a core and a cage built up of two conductor end rings and conductor bars connecting the end rings, and the stator comprising a stator core carrying a polyphase primary winding, in which motor at least one of the two conductor end rings of the rotor is provided with at least two gaps diametrically opposed to divide said one end ring into at least two separate portions, the gaps serving as insulating sections between the separate end ring portions.

According to another aspect of this invention, I provide a squirrel cage motor of the three-phase type, which comprises a rotor and a stator, the rotor being arranged in the form of a core and a cage built up of two conductor end rings of the rotor is provided with at least one series of three gaps set at 120° with respect to each other around the periphery of said one end ring to divide said one end ring into at least three separate portions, the gaps serving as insulating sections between the separate end ring portions.

A motor of this invention normally has the stator winding energised by A.C. to cause the motor to run. However, still energising one phase of the stator with A.C. whilst energising at least one other phase either with direct current (D.C.) or with A.C. of the same phase as said one phase winding will cause the motor rotor to be braked and come to rest at a predetermined angular position, determined by the gaps in the stator.

BRIEF DESCRIPTION OF THE DRAWINGS

The accompanying drawings will serve to illustrate examples of the invention. In the drawings:

FIG. 6 is a diagram showing alternative connections for a 4-pole 2 phase motor of this invention allowing normal running and braking to a predetermined position;

FIGS. 7a and 7b together show end views of a rotor modified for use in a 4 pole 2 phase motor; and FIGS. 8a and 8b together show end views of a rotor modified for use in a 4 pole 3 phase motor.

DESCRIPTION OF THE PREFERRED EMBODIMENTS

Figure 1:
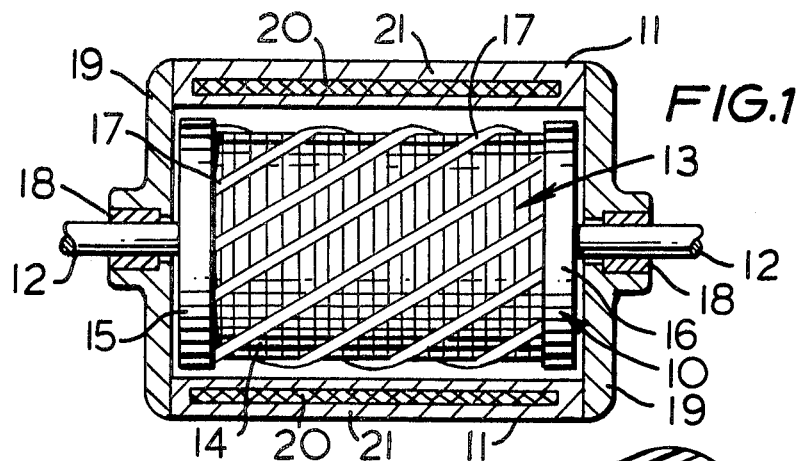
FIG. 1 is a diagrammatic cross-section side view through a conventional design of squirrel cage motor.

By a squirrel cage motor of the single phase running type is meant that the motor runs normally on single phase A.C. but the stator windings are polyphase (and usually two-phase) so as to produce a starting torque.

In the case of the single phase running squirrel cage motor according to the present invention, preferably the number of diametric gaps dividing the one end ring into separate portions is half the number of poles in the stator, so that as many separate portions as poles are provided. Thus, in the case of 2-pole stator there are preferably two gaps diametrically opposed to define two separate portions, and in the case of a 4-pole stator there are four gaps diametrically opposed in pairs.

I have discovered that when a single phase running type of squirrel cage motor of this invention is braked by the application of direct current to one phase winding, the rotor of the motor will always stop either at one particular angle of rotation with respect to the stator or at 180° to that angle; and that when a three phase squirrel cage motor of this type is braked by the application of direct current to one phase winding, the rotor of the motor will always stop at one of three 120° angles of rotation with respect to the stator.

In some squirrel cage motors the end ring may be merely a peripheral ring but in other motors the end ring may consist of virtually an end cap on the rotor but with an aperture for the driving shaft. In every case however, this end ring must either suitably be formed during manufacture or cut subsequently to leave a complete insulating gap between the separate portions of the ring. It has been found necessary completely to separate one end ring into at least two distinct parts because if a single gap is provided at one angular position only in the end ring, the rotor will not always stop but may turn slowly in a jerky manner.

The squirrel cage motor may be a single phase running type of motor or a three-phase motor. It may have two poles, i.e. it may be a motor having a synchronous speed of 3000 r.p.m. on a 50 Hz supply or it may have four poles, i.e. it may be a motor having a synchronous speed of 1500 r.p.m. on a 50 Hz supply.

A preferred form of the squirrel cage motor of the present invention is a single phase, split-phase capacitor-run 2-pole motor and in this case it has preferably one pair of gaps arranged in diametric opposition in one conductor end ring, separating the ring into two portions. A motor of this type is shown in the accompanying drawings in FIGS. 1-5. In addition, similar gaps may be provided in the other end ring; in this case of a four pole motor one pair may be in one end ring and the other pair in the other end ring, the pairs being disposed at 90° with respect to each other.

Squirrel cage motors of the present invention having at least one end ring with gaps are a little less efficient than similar motors having two complete end rings and there is a loss of about 10% of their normal torque but in other respects the motor functions similarly to the motor having two complete end rings. However either when the alternating current supplied to the motor is restricted to the winding of one phase in the stator and direct current is applied to the winding of at least one other phase, or that other phase is supplied with alternating current in phase with the current supplied to the said one phase, the rotor rapidly stops at a particular angle of rotation with respect to the stator or at one of a number of particular angles of rotation. It is not completely clear why the rotor should stop always at a predetermined angle of rotation with respect to the stator but it is thought that the provision of a split conductor-end ring on the squirrel cage rotor influences the distribution of eddy currents so that the rotor preferentially assumes a symmetrical attitude with respect to the alternating magnetic field provided by the still energised stator winding, the rotor having been braked by the direct current.

Because it is usually simpler to modify and alter bought-in squirrel cage motors by dissecting at least one end ring as described to provide the gaps than to make a squirrel cage motor of this type, it is not always clear how the stator poles are aligned in the stator and thus it is usually a matter of trial and error to determine the angle(s) of rotation at which the rotor will stop. This can be determined by placing on the shaft an indicator and noting the angle at which this stops. If the indicator does not stop at the required angle for the subsequent operation it may be corrected merely by rotating the indicator on the shaft until the indicator stops at the required angle. However, the main requirement for the motor is that the rotor stops always at a predetermined angle of rotation or at one of a number of angles with respect to the stator.

If a driven member is to be stopped at a particular angle, but the motor may stop at one of a number of angles (e.g. at any one of 3 positions spaced by 120°) the difference can be compensated for by correct selection of gearing between the driving shaft of the motor and the driven member, or by varying the position of the capacitor incorporated in the motor stator driving circuit.

Figure 2:
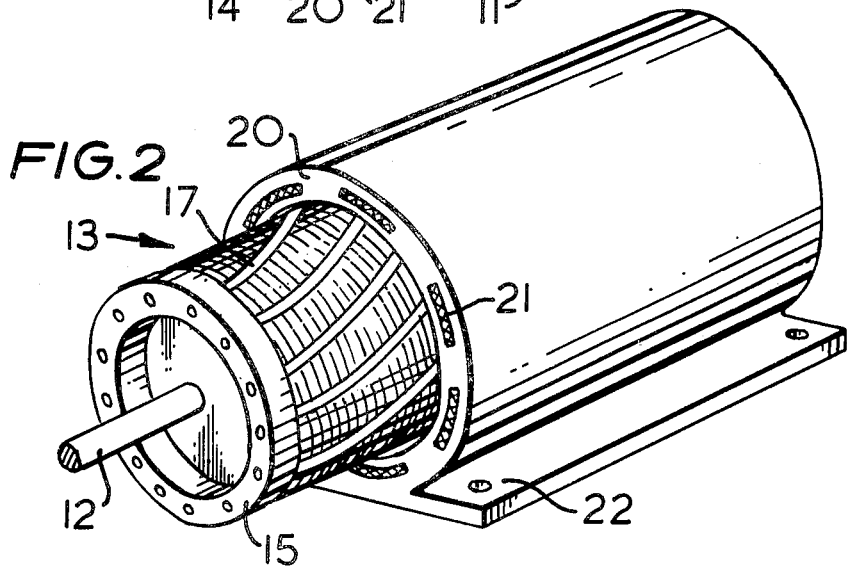
FIG. 2 is a perspective view of the same motor when partially dismantled, and showing in particular one conducting end ring.

Referring now to the accompanying drawings, the preferred embodiments will be described in greater detail, FIGS. 1 and 2 show by the contrast a conventional squirrel cage motor, which comprises a rotor 10 and a stator 11. The rotor 10 comprises a shaft 12 which supports a laminated steel core 13 each lamination 14 of which is insulated from the others, by an oxide coating on the steel. The core 13 supports an aluminium conductor cage comprising two end rings 15 and 16 connected by helically extending bars 17. The shaft 12 is supported in two bearings 18 mounted in end plates 19 of the stator 11. Between the end plates 19 is the stator core 20, again comprising steel laminations insulated from one another. The stator core 20 supports a distributed two-phase winding, the coils of which are shown at 21. The stator is provided with mounting feet 22, as shown.

The motor of FIGS. 1 and 2 is operated by providing single phase A.C. to the primary stator winding; starting torque is generated by providing the secondary stator winding with A.C. at a different phase, produced for instance by connecting a capacitor in series with the secondary stator winding across the same A.C. supply as that connected to the primary stator winding.

Figure 3:
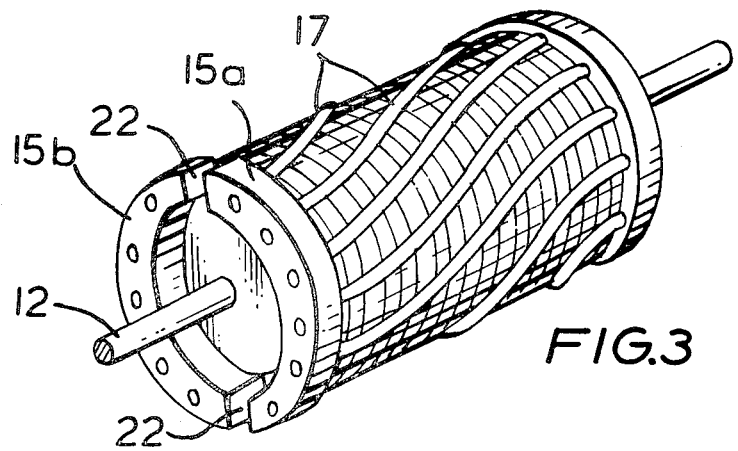
FIG. 3 is a perspective view of the rotor of the motor of FIGS. 1 and 2 but showing an end ring modified according to this invention.

The rotor shown in FIG. 3 is similar to that shown in FIGS. 1 and 2 for use in the stator also shown in those Figures; the same reference characters are used for similar parts. This rotor has however been modified in accordance with this invention by providing two diametrically-opposed gaps 22 in the end ring 15, whereby the end ring is divided into two equal portions 15a and 15b. The width of the cut forming the gaps 22 is of no great importance so long as it is sufficient to ensure electrical insulation of eddy currents between the two portions. However if the cut is too wide and severs any conductor bar 17, the efficiency of the motor will be impaired.

Figure 4:
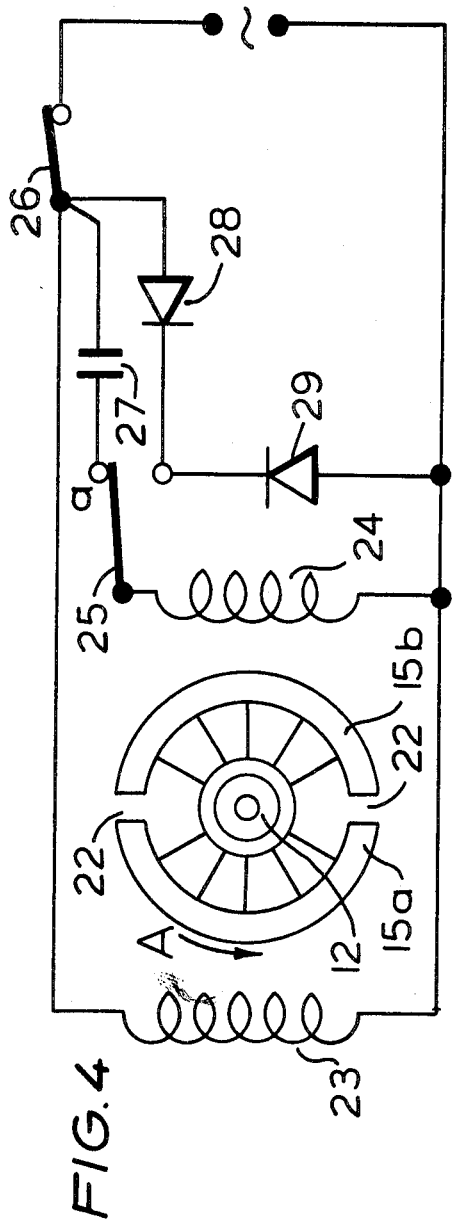
FIG. 4 is a diagram showing the normal running connections to a split phase squirrel cage motor according to the present invention.
Figure 5:
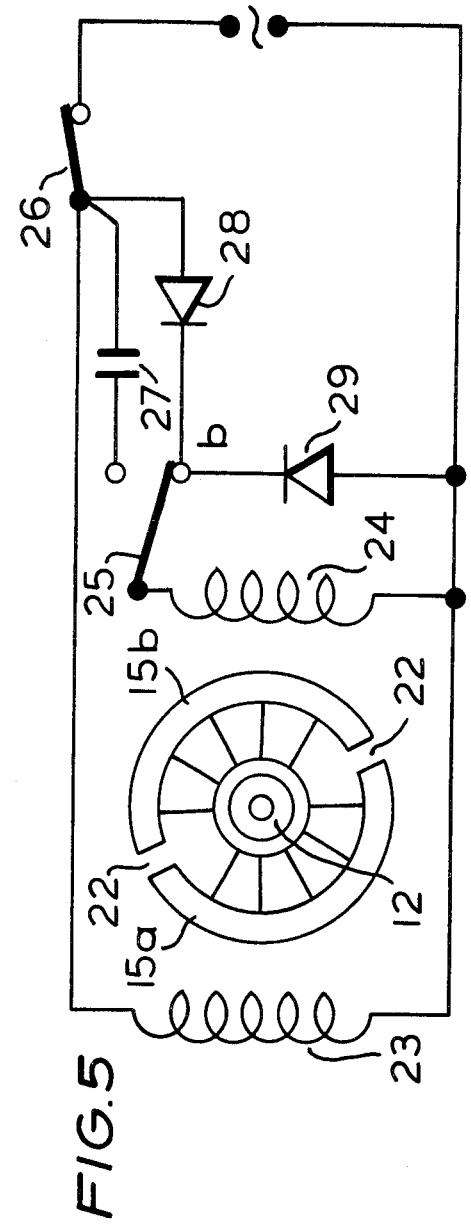
FIG. 5 is a diagram similar to that of FIG. 4 but showing the stop position of the rotor when braked by appropriate connections.

In FIG. 4 the rotor of FIG. 3 is indicated diagrammatically between the two windings of the split phase motor. The same reference characters are used in FIGS. 4 and 5 as were used in FIGS. 1 to 3. In FIG. 4 the rotor is shown located in the stator which latter is indicated by a primary winding 23 and a secondary winding 24, the rotor being located therebetween and the end ring 15 thereof being provided with two gaps 22 as described, so that the end ring is in two separate portions. In FIG. 4, there is shown a switch 25 set to the running position (a) for the motor. Single-phase alternating current is supplied through ON/OFF switch 26 to the primary winding 23 and to the secondary winding 24 through a capacitor 27 to produce the required split phase. The alternating current induces a field in the rotor and causes the rotor to rotate in the usual manner in the direction of arrow A. In FIG. 5, the switch 25 is shown moved to the braking position (b). This allows direct electric current to pass through the diodes 28 and 29 to the secondary winding and the rotor thereby is braked. The primary winding 10 remains energised by the alternating current supply. This causes the rotor to stop preferentially with its shaft at one of two angles of rotation 180° apart.

FIG. 6 shows an alternative connection arrangement for a four-pole, two phase motor, the two end views of the rotor of which are shown diagrammatically in FIGS. 7A and 7B respectively. Again, like parts are given like reference characters. As can be seen, one end ring 15 of the rotor is provided with one pair of diametrically opposed gaps 30, whereas the other end ring 16 also is provided with one pair of diametrically opposed gaps 31 but disposed at 90° with respect to the gaps of the end ring 15. In this way, both end rings 15 and 16 are divided into two separate portions, but the relative disposition of which is 90° with respect to each other.

As can be seen in FIG. 6, the run/brake switch 32 is disposed normally to connect the secondary winding 24 to the same A.C. supply as that connected to the primary winding 23, but through a capacitor 27 to obtain a split phase. When however the rotor is to be braked to stop at a required position with respect to the stator, the switch 32 is operated to connect A.C. of the same phase to both windings 23 and 24 of the stator. It is found that the rotor then is braked and always stops at one of four angular positions with respect to the stator.

FIGS. 8A and 8B are the two end views of a rotor intended for use in a four pole, three phase squirrel cage motor, but otherwise arranged as above. It can be seen that each end ring 15 and 16 is provided with three gaps 33 and 34 at 120° to each other, the gaps 33 in one ring 15 being at 60° to the corresponding gaps 34 in the other end ring 16. In other respects the rotor is similar to those described above, and the stator differs only in that three windings, one for each phase, are provided. Braking is achieved by connecting all the windings across one phase of the supply, and the rotor always then stops at one of six angular positions.

I claim:

1. A squirrel cage motor of the single phase running type and control means therefor, which motor comprises a rotor and a stator, said rotor being arranged in the form of a core and a cage built up of two conductor end rings and conductor bars connecting said end rings, and said stator comprising a stator core carrying primary and secondary windings, in which motor at least one of said two conductor end rings of the rotor is provided with at least two gaps diametrically opposed to each other to divide said one end ring into at least two separate portions, said gaps serving an insulating sections between the separate end ring portions, and said control means comprising supply means to feed a single phase alternating current supply to said primary stator winding, switch means in series with said secondary stator winding and selectively operable between a run position and a stop position, a capacitor connected between the switch means and the alternating current supply means so as to be arranged in series with said secondary winding when said switch means is in the run position so that alternating current thereby flowing through the primary and secondary windings generates a polyphase field, and full wave rectifier means also connected between the switch means and the alternating current supply means so as to be arranged in series with said secondary winding when said switch means is in the stop position whereby direct current thereby flowing through the secondary winding causes the rotor to stop at an angular position determined by the disposition of said gaps in said one end ring.

2. A squirrel cage motor and control means therefor as claimed in claim 1, in which the number of said gaps provided in said one end ring is equal to the number of poles in the stator, so that as many separate portions as poles are provided.

3. A squirrel cage motor and control means therefor as claimed in claim 2, in which the stator has two poles and one conductor end ring has two gaps disposed diametrically.

4. A squirrel cage motor and control means therfor as claimed in claim 1, in which the other end ring has two gaps disposed diametrically and at 90° to the gaps in said one end ring.

5. A squirrel cage motor of the single phase running type and control means therefor, which motor comprises a rotor and a stator, said rotor being arranged in the form of a core and a cage built up of two conductor end rings and conductor bars connecting said end rings, and said stator comprising a stator core carrying primary and secondary windings, in which motor at least one of said two conductor end rings of the rotor is provided with at least two gaps diametrically opposed to each other to divide said one end ring into at least two separate portions, said gaps serving as insulating sections between the separate end ring portions, and said control means comprising supply means to feed a single phase alternating current supply to said primary stator winding, switch means in series with said secondary stator winding and selectively operable between a run position and a stop position, a capacitor connected between the switch means and the alternating current support means so as to be arranged in series with the secondary winding when said switch means is in said run position so that alternating current flowing through the primary and secondary windings thereby generates a polyphase field, and said switch means being arranged to full wave short circuit said capacitor when said switch means is in the stop position whereby the field generated by the current thereby flowing through the secondary winding is in phase with the field of the primary winding so as to cause the rotor to stop at an angular position determined by the disposition of said gaps in said one end ring.

6. A squirrel cage motor and control means therefor as claimed in claim 5, in which the number of said gaps provided in said one end ring is equal to the number of poles in the stator, so that as many separate portions as poles are provided.

7. A squirrel cage motor and control means therefor as claimed in claim 6, in which the stator has two poles and one conductor end ring has two gaps disposed diametrically.

8. A squirrel cage motor and control means therefor as claimed in claim 5, in which the other end ring has two gaps disposed diametrically and at 90° to the gaps in said one end ring.

9. A squirrel cage motor of the three phase running type and control means therefor, which motor comprises a rotor and a stator, said rotor being arranged in the form of a core and a cage built up of two conductor end rings and conductor bars connecting said end rings, and said stator comprising a stator core carrying three polyphase windings, in which motor at least one of said two conductor end rings of the rotor is provided with at least one series of three gaps set at 120° with respect to each other around the periphery of said one end ring to divide said one end ring into at least three separate portions, said gaps serving as insulating sections between the separate end ring portions, and said control means comprising supply means to feed each phase of an alternating current supply to one stator winding respectively, switch means in series with two of said stator windings and selectively operable between a run position and a stop position, the switch means when in the run position connecting each phase of the alternating current supply to one stator winding respectively and the switch means when in the stop position connecting two windings associated therewith to the same phase of the alternating current supply as is fed to a third winding, so that the single phase alternating current thereby flowing through all three stator windings causes the rotor to stop at an angular position determined by the disposition of said gaps in said one end ring.

10. A squirrel cage motor and control means therefor as claimed in claim 9, in which one conductor end ring has three gaps set at 120° around the periphery of said one end ring to divide said one end ring into three separate portions and the other end ring has three gaps set at 120° around the periphery of said other ring to divide said other end ring into three separate portions disposed at 60° with respect to the portions of said one end ring.

* * * * *